United States Patent [19]

Royston

[11] 4,435,636
[45] Mar. 6, 1984

[54] DESOLDERING TOOL

[75] Inventor: Alan L. Royston, Canterbury, Australia

[73] Assignee: Royel International Pty. Ltd., Victoria, Australia

[21] Appl. No.: 351,305

[22] Filed: Feb. 22, 1982

[30] Foreign Application Priority Data

Feb. 23, 1981 [AU] Australia ............................. PE7718

[51] Int. Cl.³ .......................... B23K 3/04; B25G 1/10; H05B 1/00
[52] U.S. Cl. ................................. 219/230; 16/116 R; 219/227; 219/236; 219/238; 219/533; 228/20; 228/53; 228/55
[58] Field of Search ....................... 219/230, 236–241, 219/227, 229, 533; 16/116 R; 228/51–55, 19, 20, 264

[56] References Cited

U.S. PATENT DOCUMENTS

| 1,993,781 | 3/1935 | Hampton et al. | 228/55 X |
|---|---|---|---|
| 2,424,437 | 7/1947 | Dent | 16/116 R |
| 2,447,110 | 8/1948 | Bitzenburger | 219/230 X |
| 3,121,781 | 2/1964 | Schoenwald | 16/116 R |
| 3,298,572 | 1/1967 | Newton | 228/53 X |
| 3,392,897 | 7/1968 | Siegel | 228/20 |
| 3,561,662 | 2/1971 | Duhaime et al. | 219/229 X |
| 4,045,651 | 8/1977 | Koo | 228/51 X |
| 4,187,973 | 2/1980 | Fortune | 219/230 X |
| 4,209,877 | 7/1980 | Colasent | 16/116 R |
| 4,289,953 | 9/1981 | Scheu | 219/230 |

FOREIGN PATENT DOCUMENTS

| 520814 | 3/1931 | Fed. Rep. of Germany | 228/51 |
|---|---|---|---|
| 633020 | 12/1949 | United Kingdom | 219/237 |
| 2004798 | 4/1979 | United Kingdom | 219/230 |

Primary Examiner—A. Bartis
Attorney, Agent, or Firm—Stevens, Davis, Miller & Mosher

[57] ABSTRACT

A suction desoldering tool has an elongate handle, an elongate housing defining a bore therethrough and extending co-axially from one end of the handle solder, a collecting chamber in the handle, and a tubular heating bit holder. The holder is mounted in the end of the housing remote from the body and includes a body portion surrounded by an electric heating element for receiving the bit and a tubular portion of lesser wall thickness providing communication between the bit and collecting chamber. The tubular portion is surrounded by an imperforate sleeve which defines an insulating air space along the tubular portion to enable the full length of tubular portion to be maintained above the liquidus temperature for solder melted by the bit during a desoldering operation, so that the melted solder can be drawn into the collecting chamber through the bit and holder by a source of suction connected to the chamber. The tool further includes a casing in the form of a tube of asymmetrical section extending around a major portion of the circumference of the handle, at least adjacent the one end of the latter, such that the handle is held by a sliding friction in the casing, with a portion of the casing being spaced from the remaining portion of the circumference of the handle to provide a grip by which the tool is able to be held by an operator. The casing is made of perforate, thermally insulating material enabling ambient air to circulate therethrough to the handle.

12 Claims, 6 Drawing Figures

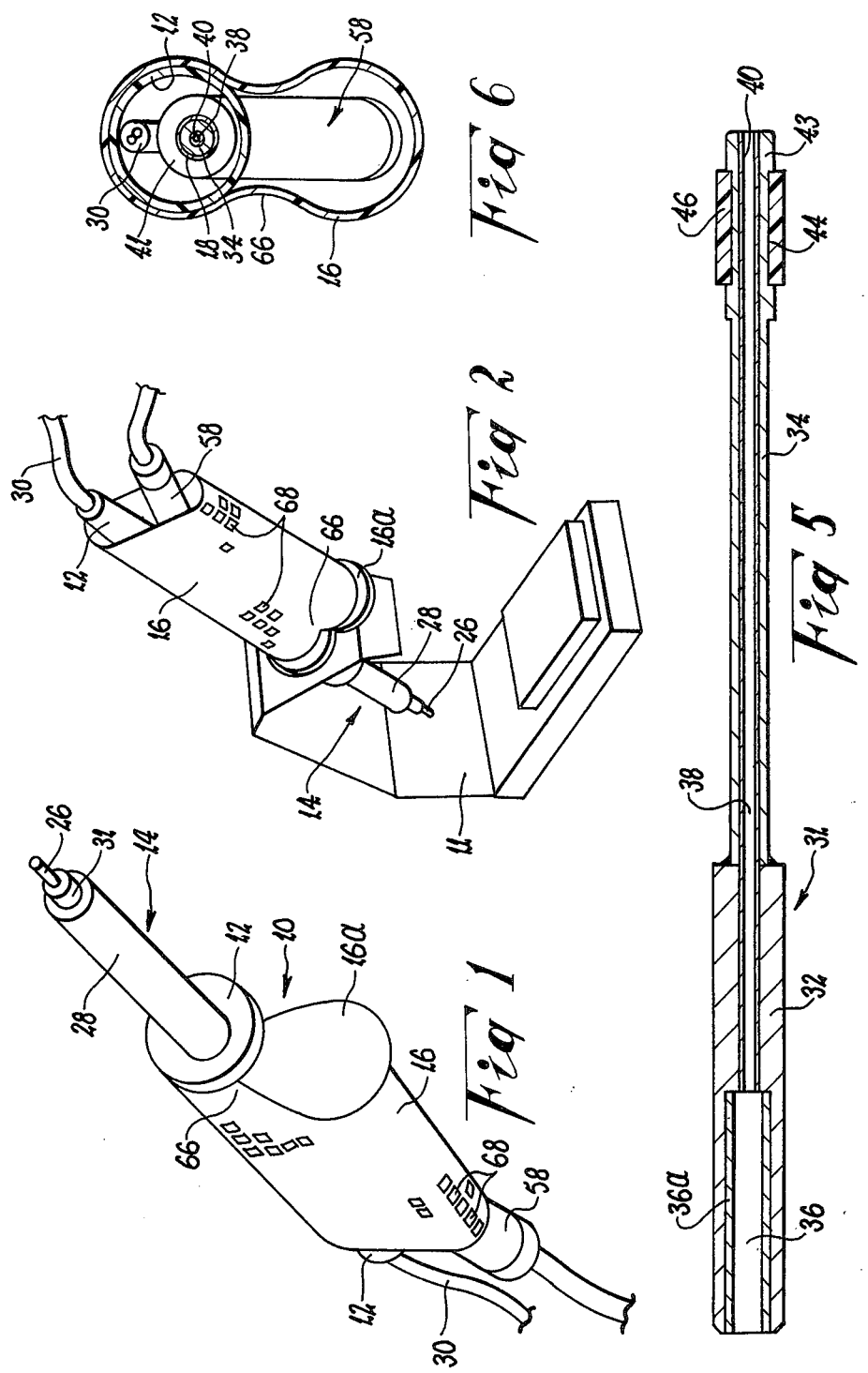

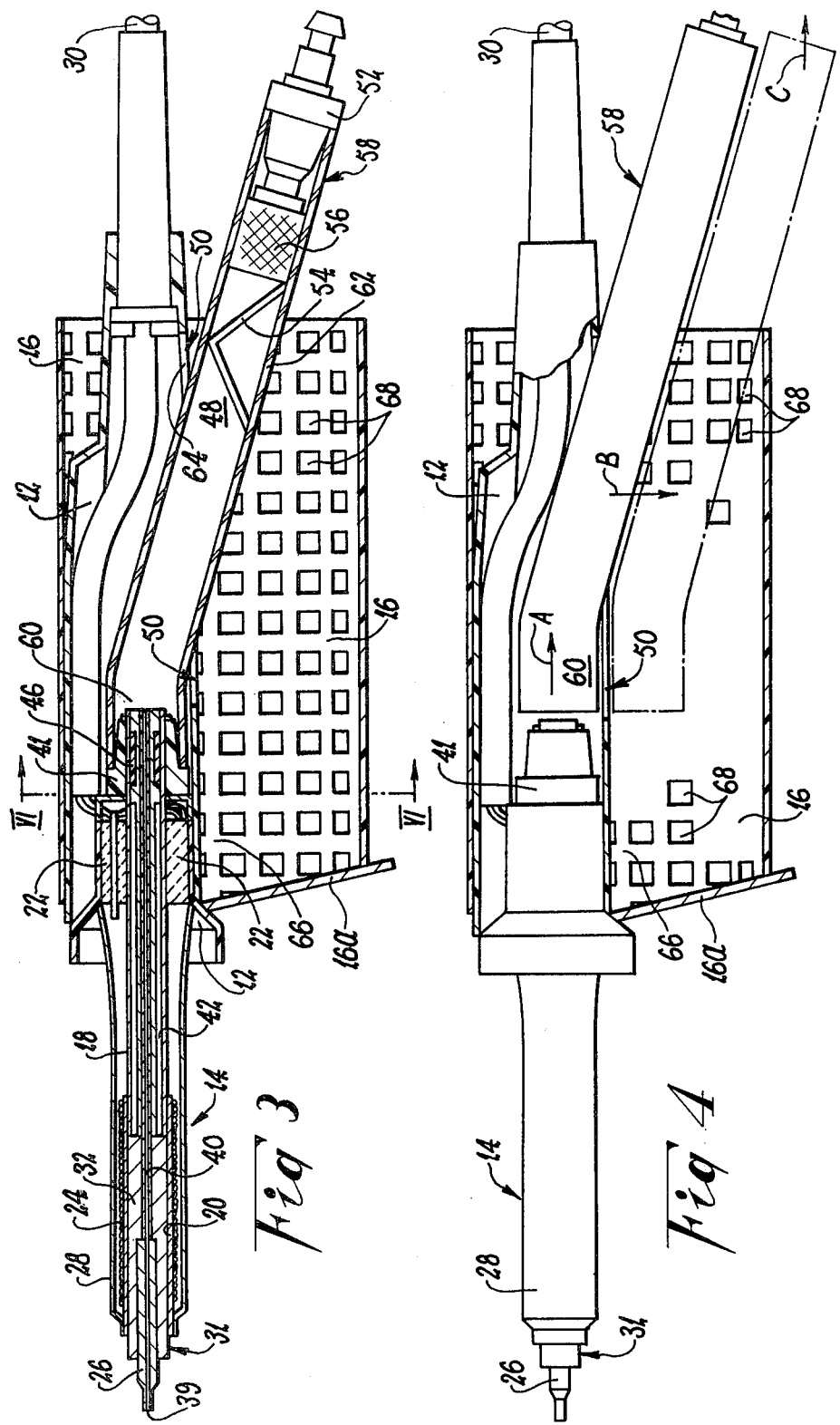

DESOLDERING TOOL

This invention relates to an improved desoldering tool enabling removal of molten solder from a soldered termination, such as of a circuit board.

Printed electronic circuits are constructed by creating a conductive pattern in an insulated copper laminated substrate (usually by removal of unwanted copper by acid etching), drilling holes and inserting and soldering in position required electronic components. Such circuits have been in use for some years and have given rise to the development of desoldering tools, the purpose of which is to melt and remove solder, allowing defective components to be removed and replaced.

Most of the desoldering tools employ some form of air suction apparatus, such as a manually operable suction bulb, an electrically driven vacuum pump or a vacuum pump actuated by air pressure. In each case, the vacuum is connected to a hollow desoldering tip or bit which is electrically heated to enable it to melt the solder. The usual method of application is to place a work face of the desoldering tip on a termination to be desoldered, either over the projecting lead from the component or adjacent to it if the lead end is bent or swaged over. When the heated tip melts the solder, the suction device is actuated and the solder is drawn into the hollow desoldering tip.

While for modern micro-electronic circuits, there is a need to control the temperature of the desoldering tip to prevent damage to the component and/or substrate, existing desoldering tools are adequate when a relatively small number of terminations are to be desoldered. Difficulties arise when extended and/or multiple successive desoldering operations are to be undertaken, since the inducted solder tends to block the desoldering tool and progressively restrict the vacuum, so that no further desoldering can be performed until the tool has been cleaned. Solidified solder is difficult to remove from the tubular construction of desoldering tools and operators have to resort to time consuming operations such as drilling, or melting to clear the tools.

The limitation of existing desoldering tools designs is that the air stream which must carry the solder particles away from an orifice at the work-face is constrained by the diameter of the orifice of the desoldering tip. The orifice diameter is restricted by the pad diameter of the printed circuit and the area of the desoldering bit end which is needed to transfer heat to melt the solder and the component lead diameter. Desoldering tip orifice diameters vary for example from 0.25 mm (0.010") to 1.90 mm (0.075") and therefore allow a relatively small air flow to support the particles of relatively heavy tin/lead alloy, (usually 60/40 or 63/37 alloy). While the solder particles are atomized they are borne relatively easily but, as they solidify during the relatively slow transit away from the desoldering orifice, they drop out of suspension in the air flow. As the desoldering tip is placed over the succeeding soldered termination to be desoldered, then of course, the air flow is halted.

In the complete specification of our co-pending Australian patent application 40120/78, solutions to this problem are proposed. One of these is to provide a desoldering tool having a handle; an elongate housing extending from the handle and having a heating bit or tip at the end thereof, remote from the handle; the bit and housing defining a bore terminating at a chamber remote from the bit, and control means intermediate the ends of the bore; the tool being adapted for connection to a source of electric current for heating the bit and to means for developing suction in the bore whereby, when the bit is applied to a soldered termination and the solder thereof is melted, the solder will be sucked through the bit and collected in the chamber, the control vent being operable to increase suction at the inner end of the bit.

In a further solution disclosed in specification 40120/78, there is provided a desoldering tool having a handle; an elongate housing extending from the handle and having a heating bit at the end thereof remote from the handle; the bit and housing defining a bore extending longitudinally therethrough and the tool being adapted for connection to a source of electric current for heating the bit and to means for developing suction in the bore so that when the bit is applied to a soldered termination and the solder thereof is melted, the solder will be sucked into the bore; the tool further including a liner sleeve extending longitudinally within the housing and defining an innermost portion of the bore in which solder is receivable; the sleeve being formed of a material that is not wet by solder; the housing being separable from the handle to enable access to the sleeve for removal of solder accumulated therein. In one form the sleeve is slit longitudinally so as to be easily distortable when twisted axially to aid in removal of solder from the sleeve. In another form, the sleeve is longitudinally tapered in order to reduce or eliminate air turbulence, so as to enhance desoldering efficiency.

These solutions of specification 40120/78, while having advantages over prior systems in that the useful operating life, before it it necessary to clean out collected solder, is enhanced. However, it is found that the first solution does not entirely eliminate collection of solder within the housing, intermediate the bit and the collection chamber, where it can be difficult to remove. Also, with the second solution, there is difficulty in educating users in the correct method for removal of solder accumulated in the liner sleeve. Additionally, while a liner sleeve which is not wetted by solder can readily be provided, there is difficulty in providing such liner sleeve of a material which also is not wetted by flux which can be carried into the sleeve during desoldering.

The present invention is directed to providing an improved desoldering tool enabling more effective desoldering over an increased number of desoldering operations.

It is found that the principal difficulty to be overcome in preventing blocking of desoldering tools arises not only from the wetting of surfaces with molten solder, but also from the short time interval necessary for solder to drop in temperature sufficiently to solidify. The first aspect of the present invention utilizes recognition of the need for control in the temperature gradient to which molten solder is exposed during a desoldering operation to maintain the solder molten substantially until it is discharged into a collection chamber. A second aspect of the invention is directed to providing a desoldering tool in which removal of collected solder is facilitated.

In a first aspect, the invention provides a desoldering tool having a handle; an elongate housing defining a bore therethrough and extending from an end of the handle, a collecting chamber having at least an inlet portion in the handle and a heating bit assembly having a hollow bit and a bit holder. The holder has a body portion, by which the assembly is mounted in said bore adjacent the end of the housing remote from the handle, and an elongate tubular portion extending from the body portion, longitudinally in the bore of the housing, to the collecting chamber. The body portion of the holder has a bore at its end remote from handle in which the bit is received, and the holder defines longitudinally therein a passage providing communication between the bit and the collecting chamber. The tool is adapted for connection to a source of electric current for heating the bit through the body portion of the holder, and to means for developing suction in the chamber and passage. The bit holder is of metal so that heating of the bit through the body portion of the holder for a desoldering operation results in the tubular portion of the holder being raised to a temperature sufficient to maintain solder, drawn through said bit and passage, molten until said solder passes into the collecting chamber.

The bit assembly most conveniently is formed substantially entirely of metal, such as of copper. The bit and bit holder may have an anti-corrosion coating of iron or of nickel and/or chromium. The bit holder also may be of integral construction, although the body and tube portions most conveniently are formed separately and secured together such as by silver soldering. Transversely of the tube portion, the bit holder may be of circular section. However, other sections, such as square, are possible for the body portion and/or the tube portion.

However, it is important that the body and tubular portions of the bit holder be associated such that transfer of heat energy from the former to the latter is efficient. Thus, if those portions are not integral, or made separately and secured together such as by silver soldering or brazing, they should be in screw threaded engagement or connected by a tight friction fit. For the same reasons, the bit should be similarly associated with the body portion of the bit holder.

The bit may be in the form of a conventional desoldering bit. That is, it may be a tubular element through which a passage extends axially between an end workface, by which heat is applied to a termination to be desoldered, and a remote end face. The tubular portion of the bit holder defines an extension of the body portion and most conveniently is of substantially greater length than the body portion. The tubular portion may, for example, be from twice to four times the length of the body portion or of even greater length.

The bore of the body portion may be of substantially the same cross section as the exterior of the bit, while the respective passage of the bit and the bit holder may be of substantially the same section. The tubular portion may be of lesser external section, over at least a major portion of its length than the body portion. In the latter case, the arrangement may be such that when located in the housing of the desoldering tool, the bit is heated by thermal contact between the bit and the body portion and between the latter and the housing; with the tubular portion being spaced from the housing and heated substantially by heat flow from the body portion. Due to such heating of the bit, it is found that sufficient heat energy can be applied to, and stored in, the body portion to enable repeated desoldering operations. However, as a result of heat flow to the tubular portion, the bit holder overall remains at a temperature sufficient to maintain solder and flux molten as it is drawn through the bit and both the body and tubular portions of the bit holder. In view of the substantial length of the tubular portion, its wall thickness most conveniently is about half, or less than that of the body section so as to minimise the heat energy necessary to maintain the tubular portion at a temperature above the melting point of the solder.

As indicated above, the bit and bit holder may be of copper. However, other metals or alloys having suitable thermal conductivity can be used.

The passage through the bit and that through the bit holder most conveniently are the same diameter, and they may be from 0.25 mm to 1.90 mm in diameter. Such diameter most conveniently is maintained through to the end of the tubular portion remote from the body portion. To prevent blockage of the passage of the bit holder over its length, it may be lined with a thin-wall sleeve of a metal, such as stainless steel, which is not wetted by molten solder; while that or a similar sleeve may line the passage of the bit. Due to the temperature at which the solder is maintained in passing through the bit and bit holder, flux entrained with the solder also is unable to accumulate in the bit.

Where such liner sleeve is provided, the above-mentioned anti-corrosion coating may be on external surfaces only.

The invention also provides a desoldering tool having an elongate body, an elongate housing defining a bore therethrough and extending co-axially from one end of the body, a collecting chamber having at least an inlet portion in the body, and a heating bit and a bit holder, the holder being mounted in the end of the housing remote from the body and providing communication between the bit and the collecting chamber. The tool is adapted for connection to a source of electric current for heating the bit, and to means for developing suction in the chamber such that solder melted by the bit is able to be drawn through the bit and holder into the collecting chamber. The tool further includes a casing in the form of a tube of asymmetrical section, the casing extending around a major portion of the circumference of the body at least adjacent the one end of the latter such that the body is held by a sliding friction in the casing, a portion of the casing being spaced from the remaining portion of the circumference of the body to provide a grip by which the tool is able to be held by an operator. The casing is of perforate, thermally insulating material enabling ambient air to circulate therethrough to the body.

The casing may encircle or be integral with the main body and, at least around a portion of the latter, conform closely to the external configuration of the body. However, the collecting chamber most conveniently extends to one side of the body and, at that side, the casing may be spaced from the body and extend around the chamber. With such arrangement for the chamber, the latter may be of tubular form. The chamber may, for example, have a first section defining an inlet end through which solder is received, and an elongate second section inclined at an angle to the first section and extending from one side of the body of the tool.

Where the chamber is of tubular form, it may be releasably inserted into the body of the tool, such as through an opening in the one side of the body. Thus, where the chamber has the above described first and second sections, the first section may be receivable through such opening and, in such case, the container may be slidable in the longitudinal direction of the housing to locate the inlet end of the chambers in a solder receiving position for the chamber. The opening in the body of the tool may have a dimension transversely of that direction such that the first section of the chamber is received therein by a snap-fitting action.

The casing may be spaced from the one side of the body of the tool so as to permit insertion and removal of the collecting chamber. Alternatively, the casing may be slidable on the body of the tool to enable the body and the collecting chamber to be drawn from one end of the casing to permit removal and insertion of the chamber.

The casing most conveniently is of stiff construction to facilitate its use as a grip for the tool. Additionally, it should be of a material of low thermal conductivity, such as a plastic material or plastic coated metal. Also, to minimize heating of the casing, the latter should have over its surface perforations which in aggregate surface area account for from one-third to one-half or more of the external surface area of the casing if calculated on the basis of its overall dimensions.

The perforations most conveniently are in a uniform array, such as of 2 to 4 mm squares. However, the perforations can be of other forms, such as circular.

It is to be appreciated that the various aspects of the invention can be incorporated in a single desoldering tool.

In order that the invention may be more readily understood description now will be directed to the drawings, in which:

FIG. 1 shows a respective perspective view of a desoldering tool,

FIG. 2 is a perspective view of the tool of FIG. 1 in a storage stand,

FIGS. 3 and 4 show sectional views of the tool of FIG. 1, with FIG. 4 illustrating the method of removal of the solder collecting chamber, FIG. 5 shows on an enlarged scale a portion of the tool of FIG. 1, and FIG. 6 is a sectional view on line VI—VI of FIG. 3.

The tool 10, which may be stored on a stand 11 (FIG. 2), has a handle or body 12 and a housing 14 projecting from one end of the handle. The handle is located in casing 16 by which tool 10 is held or gripped in use.

Housing 14 is of tubular form, and includes therein a rear tube 18 and a forward tube 20 mounted concentrically on tube 18. Tube 18 extends through an insulating collar 22 mounted in the forward end of handle 12. An electric heating element 24 surrounds tube 20 for heating the latter and tip or bit 26 at the forward end of tube 20. A sleeve 28 encloses tubes 18,20 and coil 24, with the latter being supplied with energizing current by power lead 30.

As shown in FIGS. 3 and 4 bit 26, which is formed of metal and is of circular section, is carried by a bit holder 31 having a body portion 32 and, extending rearwardly therefrom, an elongate tubular portion 34. Body portion 32 has a bore 36 extending from its forward end in which bit 26 is held and which communicates with the passage 38 through portion 34. As shown, passage 38 extends from the inner end of bore 36 and provides a smooth continuation of bore 39 of bit 26. Within passage 38, there is a liner sleeve 40 of stainless steel. A similar liner sleeve (not shown) can be provided in bore 39 of bit 26, while a liner 36a is provided in bore 36 around bit 26.

Bit holder 31 is inserted through housing 14 such that bit 26 projects from housing 14. The rearward end of holder 31 projects beyond the rearward end of housing 14, and through collar 22 and adjacent silicone rubber bush 41, into the interior of handle 12. As shown most clearly in FIG. 5, tubular portion 34 is of lesser external section than body portion 32; the arrangement being such that portion 32 is held in thermal contact with tube 20, while portion 34 is spaced from the interior of tube 18 by an insulating, annular air gap 42. Tube 18 most conveniently is made integral with body portion 32 of bit holder 31.

At its rearward end tubular portion 34 has a raised annular section 43 defining an annular groove 44 in which an insulating, sealing sleeve 46 is located. Sleeve 46 may be of a material of low thermal conductivity and spaces portions 34 from the inner surface of bush 41. Sleeve 46 may be of a plastic material, and most conveniently provides a resilient seal around the interior of tube 18.

Tool 10 also includes a collecting chamber 48. This is of elongate tubular form and has an inlet end inserted through a side opening 50 of handle 12, and neatly received over the tapered rearward end of bush 41. The other end of chamber 48 has a fitting 52 for connection to a vacuum source. With the chamber, there is a baffle 54 and, between the latter and fitting 52, a fibrous filtering wad 56.

In use of tool 10, bit 26 is heated by coil 24, via tube 20 and portion 32 of holder 31, and applied to a termination to be desoldered. On melting of the solder of the termination, or prior thereto, the vacuum source connected to fitting 52 is actuated. The molten solder (and any flux) thus is drawn under the influence of the reduced pressure prevailing in chamber 48 so as to pass through bit 26 and into chamber 48. Due to heating of body portion 32 of bit holder 31, heat energy passes from portion 32 to tubular portion 34; the resultant temperature of the latter being sufficient to ensure that the solder does not solidify until it has passed through the bit and bit holder. Air gap 42 and sleeve 46 serve to minimise loss of heat from the bit via portion 34, although some heating of collar 22 and the surround portion of handle 12 does result.

Solder passing into chamber 48 impinges on baffle 54 and solidifies on the latter. Wad 56 serves to isolate the vacuum source from solder fines by absorbing these.

As shown, chamber 48 is provided by an elongate tube 58, for example of heat resistant glass or plastic material. Adjacent bush 41, tube 58 is bent so as to define a short inlet section 60 co-axial with respect to handle 12, and a main section 62 inclined with respect to the axial of housing 12. Inlet section 60 is neatly received on the external taper of bush 41 so as to provide a seal therebetween and to hold inlet section 60 in axial alignment with the longitudinal extent of bit 26 and holder 31. Section 62 inclines rearwardly and outwardly, through opening 50, with respect to handle 12, housing 14 and the longitudinal extent of bit 26 and holder 31.

Tube 58 is removable from handle 12 by first being drawn rearwardly from its position shown in FIG. 1 to its position shown in solid outline in FIG. 2, along the line of arrow A. Thereafter, tube 58 is drawn downwardly in the direction of arrow B, to the position shown in broken outline in FIG. 2 in which it is clear of opening 50. Finally, tube 58 is simply drawn rearwardly as indicated by arrow C, to clear casing 16 and permit removal of solder collected in chamber 48. The reverse procedure is followed for reinsertion of tube 58.

The extent of opening 50 in the direction of arrow A is such as to permit the initial rearward (and reverse)

movement of tube 58 for removal (and reinsertion), i.e. opening 50 defines a clearance 64 rearwardly of tube 58 when the latter is received on bush 41. However, laterally of the direction of arrow A, opening 50 is dimensioned such that opening 50 provides a snap-action engagement with inlet section 60 of tube 58 on insertion of the latter.

Casing 16 extends entirely around handle 12, adjacent the junction of the latter with housing 14; the casing being open at each end and in the form of a tube of asymmetrical section, such that handle 12 extends through it. Apart from the side of handle 12 from which tube 58 extends, casing 16 conforms closely to the external form of handle 12 and due to the side walls of casing 16 being centrally deformed inwardly at least at the forward end thereof as at 66, handle 12 is held in an upper portion of casing 16. However, the deformation at 66 is not such as to reduce the spacing between the side walls to less than the diameter of tube 58, so that if required casing 16 can be slidingly removed over the rear end of handle 12 without the need for prior removal of tube 58.

Casing 16 is of perforate material, with perforations 68 extending over its surface. For convenience, only some perforations are shown in FIGS. 1 and 2. Also, the material of which casing 16 is formed has a low thermal conductivity such that, notwithstanding heating of handle 12 due to heat conducted along bit portion 34, casing 16 does not become unduly warm. Casing 16 thus provides a grip by which an operator is able to hold the tool during use, without inconvenience.

Casing 16 may be formed of a suitable plastic material, or of perforate metal having a suitable protective coating such as a plastic material.

While the casing shown is of perforate form, other arrangements are possible. Thus, the casing can be of similar overall configuration but, instead of being perforate, it can be provided on its inner and/or its outer surface with ribs. In the case of ribs on the inner surface, these define therebetween spaces in which ambient air reduces transfer of heat energy from handle 12 to the casing. In the case of ribs on the outer surface, these serve a similar function in reducing transfer of heat energy to the casing to an operator holding the tool. It will be appreciated that particularly in the ribbed form of the casing where the ribs are on the outer surface, the casing can be formed integrally with handle 12.

There has been a recent trend to relatively slim desoldering tools able to be held by an operator in a pencil grip. Such a tool is described in the above-mentioned application 40120/78. However, in these prior tools, the slim form of the handle or body has been a factor preventing a solution as provided by the present invention since an elongate bit holder, such as holder 31, would be entirely unacceptable, due to resultant heating of the handle or body at the location at which it is held by an operator. Recourse to vent holes at that location, to allow cooling ambient air to circulate through the handle or body can alleviate the problem of heating to a degree, but also cools and reduces the efficiency of the holder 31 so that solder solidifies before reaching the collecting chamber. Of course, a substantial increase in the diameter of the handle or body would enable the ambient air to be isolated from the holder, but this means that the slim line of the tool enabling it to be held in a pencil grip, and resultant ease of use, is sacrificed.

The present invention enables retention of a slim handle 12, by use of a casing 16. As shown most clearly in FIG. 6, casing 16, in transverse section adjacent the forward end of handle 12, approximates to an hourglass shape. The upper portion of casing 16 closely follows the external circumference of that end of handle 12; while the lower portion is the inverse of the upper portion, but below handle 12, and the central portion is waisted. The tool is able to be held in the same pencil grip fashion as the prior art tools to which reference is made above but, in the present case, the tool is held by the portion of casing 16 located below handle 12. Thus, an operator is able to rest the underside of casing 16 on his second finger and on the webbing between the base of his thumb and forefinger, and to securely grip the tool by his thumb and forefinger engaging a respective side of casing 16 at the deformed portion 66 of the latter. The tool thus can be held and used for prolonged periods since the grip is on the heat insulating casing 16, substantially below handle 12, while the perforate form of casing 16 allows for substantial movement of air around handle 12.

A cover plate 16a (FIGS. 1 and 2) is provided over the front of the lower portion of casing 16, principally for aesthetic considerations.

Thus, while the present tool at first may appear to be of more complex form than prior art tools and, as a consequence, to be more difficult to use, it in fact is not. Rather, the present tool does not differ substantially in weight or ease of use from the prior art "pencil grip" tools, but does enable more efficient desoldering while retaining substantially the same ease of pencil grip holding and avoidance of operator discomfort due to localized heating.

Finally, it is to be understood that various alterations, modifications and/or additions may be introduced into the constructions and arrangements of parts previously described without departing from the spirit or ambit of the invention.

Having now described by invention, what I claim as new and desire to secure by Letters Patent is:

1. A desoldering tool having an elongate handle; an elongate housing defining a bore therethrough, and extending from one end of the handle; a collecting chamber having at least an inlet portion thereof within the handle, which portion defines an inlet to the chamber; a heating bit assembly having a hollow heating bit, and a bit holder; and a connector associated with said chamber for connecting the tool to means for developing suction in the chamber; the holder having a body portion, around which is provided an electric heating element connectable to a source of electric current for heating the body portion and bit, and an elongate tubular portion; the holder being mounted longitudinally in the bore of the housing with its body portion adjacent the end of said bore remote from the handle and with the tubular portion terminating in the chamber inlet, and the holder defining a longitudinal passage therethrough with the bit received in the end of the passage at said remote end of the housing so that the bit is in communication with the chamber; the tubular portion of the bit holder being of lesser wall thickness than the body portion, and the holder further including an imperforate sleeve through which the tubular portion extends and which has one end mounted on the body portion and its other end extending into the chamber inlet so as to enclose, and to define around the tubular portion, an insulating air space extending along the length of the tubular portion; said lesser wall thickness of the tubular portion and the air space enabling substantially the full length of the tubular portion to be maintained at a temperature above the liquidus temperature for solder melted by the bit during a desoldering operation, which heat loss from the body portion to the tubular portion such as to impair desoldering, so that the melted solder can be drawn through the tubular portion and into the chamber prior to solidification.

2. A desoldering tool according to claim 1, further including a casing extending to one side of the handle at least adjacent the junction of the latter and the housing, the casing providing a grip by which the tool is able to be held by an operator and being of thermally insulating material reducing transfer of heat from the handle.

3. A desoldering tool according to claim 2, wherein said casing is perforate and at least over the surfaces thereof is of a thermally insulating plastics material.

4. The desoldering tool according to claim 1, wherein said handle is substantially co-axial with said housing.

5. The desoldering tool according to claim 4, wherein the collecting chamber comprises an elongate tubular member of which an end section extending axially of the handle defines said inlet portion, and a laterally inclined section of said tubular member extends through an opening in a peripheral wall of the handle.

6. A desoldering tool according to claim 5, further including a casing in the form of a tube of asymmetrical section, the casing extending around a major partion of the circumference of the handle at least adjacent the one end of the latter such that the handle is held by a sliding friction fit in the casing, a portion of the casing being spaced from the remaining portion of the circumference of the handle so as to extend around the laterally inclined portion of the collecting chamber and provides a grip by which the tool is able to be held adjacent the handle by an operator; the casing being of thermally insulating material and enabling ambient air to circulate therethrough to the handle.

7. The desoldering tool according to claim 5 wherein the collecting chamber is removable and the opening in said peripheral wall is of elongate form such that the collecting chamber can be separated from the handle by:
(i) being drawn axially of the handle, away from the one end of the latter, to disengage the inlet of the chamber from holder, and
(ii) being drawn perpendicularly of the handle through the opening;
the collecting chamber being in a friction fit between sides of the opening spaced laterally of the handle.

8. A desoldering tool having an elongate handle enabling the tool to be held by an operator in a pencil grip; an elongate housing defining a bore therethrough, and extending co-axially from one end of the handle; a collecting chamber having at least an inlet portion thereof within the handle, which portion defines an inlet to the chamber; a heating bit assembly having a hollow heating bit, and a bit holder; and a connector associated with said chamber for connecting the tool to means for developing suction in the chamber; the holder having a body portion, around which is provided an electric heating element connectable to a source of electric current for heating the body portion and bit, and an elongate tubular portion; the holder being mounted longitudinally in the bore of the housing with its body portion adjacent the end of said bore remote from the handle and with the tubular portion terminating in the chamber inlet, and the holder defining a longitudinal passage therethrough with the bit received in the end of the passage at said remote end of the housing so that the bit is in communication with the chamber; the tubular portion of the bit holder being of lesser wall thickness than the body portion, and the holder further including an imperforate sleeve through which the tubular portion extends and which has one end mounted on the body portion and its other end extending into the chamber inlet so as to enclose, and to define around the tubular portion, an insulating air space extending along the length of the tubular portion; said lesser wall thickness of the tubular portion and the air space enabling substantially the full length of the tubular portion to be maintained at a temperature above the liquidus temperature for solder melted by the bit during a desoldering operation, without heat loss from the body portion to the tubular portion such as to impair desoldering, so that the melted solder can be drawn through the tubular portion and into the chamber prior to solidification; the tool further including a casing in the form of a tube of asymmetrical section, the casing extending around a major portion of the circumference of the handle at least adjacent the one end of the latter such that the handle is held by a sliding friction in the casing, a portion of the casing being spaced from the remaining portion of the circumference of the handle to provide a grip by which the tool is able to be held by an operator; the casing being of perforate, thermally insulating material enabling ambient air to circulate therethrough to the handle.

9. The desoldering tool according to claim 8, wherein the collecting chamber comprises an elongate tubular member of which an end section extending substantially axially of the handle defines said inlet portion, and a laterally inclined section of said tubular member extends through an opening in a peripheral wall of the handle.

10. The desoldering tool according to claim 9, wherein the collecting chamber is removable and the opening in said peripheral wall is of elongate form such that the collector chamber can be separated from the handle by:
(i) being drawn axially of the handle, away from the one end of the latter, to disengage the inlet of the chamber from holder, and
(ii) being drawn perpendicularly of the handle through the opening;
the tubular member defining the chamber being in a friction fit between sides of the opening spaced laterally of the handle.

11. A desoldering tool according to any one of claims 8-10, wherein said casing has substantially uniformly disposed perforations, the aggregate surface area of the perforations being from one-third to one-half of the external surface area of the casing as calculated on the basis of overall dimensions of the casing.

12. The desoldering tool according to claim 1 or claim 8 wherein said bit holder is made of copper and has a lining which is not corroded by molten solder.

* * * * *